(12) United States Patent
Lambert (10) Patent No.: US 11,351,515 B2
(45) Date of Patent: Jun. 7, 2022

(54) PRESSURE-RELEASE VESSEL WITH RIGID PROPORTIONAL LINER AND ASSOCIATED MICROWAVE-ASSISTED CHEMISTRY METHODS

(71) Applicant: CEM Corporation, Matthews, NC (US)

(72) Inventor: Joseph J. Lambert, Charlotte, NC (US)

(73) Assignee: CEM Corporation, Matthews, NC (US)

( * ) Notice: Subject to any disclaimer, the term of this patent is extended or adjusted under 35 U.S.C. 154(b) by 187 days.

(21) Appl. No.: 16/353,302

(22) Filed: Mar. 14, 2019

(65) Prior Publication Data

US 2020/0290001 A1      Sep. 17, 2020

(51) Int. Cl.
*H05B 6/80*        (2006.01)
*H05B 6/68*        (2006.01)
(Continued)

(52) U.S. Cl.
CPC ............ *B01J 3/042* (2013.01); *B01J 3/03* (2013.01); *B01J 19/126* (2013.01); *H05B 6/806* (2013.01);
(Continued)

(58) Field of Classification Search
CPC .... H05B 2214/03; H05B 6/806; B01J 19/126; B01J 2219/0209; B01J 2219/1215;
(Continued)

(56) References Cited

U.S. PATENT DOCUMENTS

| 4,105,061 A | 8/1978 | Tunnicliffe |
| 5,230,865 A | 7/1993 | Hargett |

(Continued)

FOREIGN PATENT DOCUMENTS

| CN | 105056861 | 11/2015 |
| CN | 205604309 | 9/2016 |

(Continued)

OTHER PUBLICATIONS

Anton-Paar Microwave Synthesis Monowave 400/200; https://www.anton-paar.com/us-en/products/details/microwave-synthesis-monowave-400200/; accessed Mar. 28, 2019; 5 pages.

(Continued)

*Primary Examiner* — Quang T Van
(74) *Attorney, Agent, or Firm* — Additon, Pendleton & Witherspoon, P.A.

(57) ABSTRACT

A structural improvement for microwave-assisted high temperature high-pressure chemistry vessel systems is disclosed that among other advantages offers dynamic venting and resealing while a reaction proceeds and eliminates the risk of cross contamination associated with systems that use a common pressurized chamber. The improvement includes a relatively thin-walled disposable liner cylinder that includes one closed end and one open end defining a mouth, and a liner cap positioned in the mouth of the rigid liner cylinder for closing the rigid liner cylinder. The liner cap includes a depending column that engages the inside diameter of the rigid liner cylinder, and a disk at one end of the depending column having a diameter sufficient to rest upon the rigid liner cylinder without falling into the rigid cylinder liner so that the cylindrical liner cap can rest in the rigid liner cylinder at the mouth of the rigid liner cylinder. The depending column, includes a passage to provide a gas venting (Continued)

space, and a dynamic venting action, between the liner cap and the rigid liner cylinder.

15 Claims, 7 Drawing Sheets

(51) Int. Cl.
*B01J 3/04* (2006.01)
*B01J 3/03* (2006.01)
*B01J 19/12* (2006.01)

(52) U.S. Cl.
CPC ... *B01J 2219/1236* (2013.01); *H05B 2214/03* (2013.01)

(58) Field of Classification Search
CPC .......... B01J 2219/1218; B01J 2219/123; B01J 2219/1233; B01J 2219/1236; B01J 2219/1257; B01J 3/03; B01J 3/042
USPC ....... 219/686, 682, 695, 696, 697, 702, 703, 219/704, 710, 711, 716, 718, 759; 422/117, 118, 198, 208, 242, 99, 102, 422/104, 113; 374/110, 149, 150
See application file for complete search history.

(56) References Cited

U.S. PATENT DOCUMENTS

| | | | |
|---|---|---|---|
| 5,264,185 A | 11/1993 | Floyd | |
| 5,369,034 A | 11/1994 | Hargett | |
| 5,427,741 A | 6/1995 | Bennett | |
| 5,520,886 A | 5/1996 | Bennett | |
| 5,830,417 A | 11/1998 | Kingston | |
| 6,084,226 A * | 7/2000 | Greene | B01J 19/126 219/710 |
| 6,136,276 A | 10/2000 | Hargett | |
| 6,258,329 B1 | 7/2001 | Mutterer, Jr. | |
| 6,286,702 B1 | 9/2001 | Buermann | |
| 6,287,526 B1 * | 9/2001 | Hargett, Jr. | B01J 19/0073 204/157.15 |
| 6,927,371 B1 | 8/2005 | Hargett, Jr. | |
| 8,795,608 B2 | 8/2014 | Hargett | |
| 8,852,533 B2 | 10/2014 | Hargett | |
| 10,065,168 B2 | 9/2018 | Goldstein | |
| 2003/0127313 A1 | 7/2003 | Lautenschlager | |
| 2006/0104870 A1 | 5/2006 | Rumps | |
| 2010/0227413 A1 | 9/2010 | Hargett, Jr. | |
| 2011/0036705 A1 | 2/2011 | Barclay | |
| 2014/0117008 A1 | 5/2014 | Lautenschlaeger | |
| 2016/0096162 A1 | 4/2016 | Barclay | |
| 2017/0312728 A1 | 11/2017 | Goldstein | |
| 2017/0320032 A1 | 11/2017 | Collins, Jr. | |
| 2018/0221845 A1 | 8/2018 | Goldstein | |

FOREIGN PATENT DOCUMENTS

| | | |
|---|---|---|
| DE | 4412887 | 10/1995 |
| DE | 10016962 | 2/2002 |
| EP | 1921898 | 5/2008 |
| WO | 2004022234 | 3/2004 |

OTHER PUBLICATIONS

Anton-Paar Monowave 450 Automated Microwave-assisted Extraction; https://www.anton-paar.com/us-en/products/details/monowave-450-automated-microwave-assisted-extraction/; accessed Mar. 28, 2019; 5 pages.
U.S. Appl. No. 15/934,164, filed Mar. 23, 2018 for Vessel and Disposable Inner Sleeve for Microwave Assisted Reactions).
De Oliveira; Sample Preparation for Atomic Spectroscopy: Evolution and Future Trends; J. Braz , Chem. Soc., vol. 14, No. 2, 2003; pp. 174-182.
Definitions of "nest" and "nested"; Lawrence Urdang and Stuart Flexner, The Random House College Dictionary, 1972, Random House Inc.
FlexiWAVE Microwave Synthesis Platform; https://milestonesci.com/flexiwave-microwave-synthesis-platform/; accessed Mar. 28, 2019; 4 pages ????
Legere et al., Design and Operation of a Capsule-Based Microwave Digesion System; Anal. Chem. 1998, 70, pp. 5029-5036.
Microwave Digestion of Cannabis & Cannabis-Based Foods for Trace Metals Analysis; CEM Corporation; 2018; 3 pgs.
Microwave Reaction System for Sample Preparation; Anton Paar GmbH; 2017; 12 pgs.
Milestone Ethos X Advanced Microwave Extraction System for Environmental Applications brochure; 2017; 12 pages.
Multiwave 7000 (Anton Paar, 3955 World Houston Parkway, Suite 170, Houston, TX 77032, https://www.anton-paar.com/us-en/products/details/microwave-digestion-system-multiwave-7000/ (accessed Jan. 3, 2019); 5 pages.
Operation of the Mars 5 Microwave Accelerated Reaction System; CEM Corporation; 2001; 7 pgs.
Reaction control; Control of pressure and temperature; Berghof Products+Instruments GmbH; [date unknown] 3 pgs.
SynthWAVE Microwave Synthesis System; https://milestonesci.com/synthwave-microwave-synthesis-system/; accessed Mar. 23, 2019; 6 pages.
Thermo-iCap Q™ inductively coupled plasma mass spectroscopy (ICP-MS) instrument; ThermoFisher Scientific, www.thermofisher.com; accessed Feb. 27, 2019; 5 pages.
Ultrawave Microwave Acid Digestion System (Milestone Inc., 25 Controls Drive, Shelton, CT 06484, https://milestonesci.com/ultrawave-microwave-acid-digestion-system/(accessed Jan. 3, 2019).
US EPA Method 3051A; Microwave Assisted Acid Digestion of Sediments, Sludges, Soils, and Oils; Feb. 2007, 30 pgs.
US EPA Method 3546; Microwave Extraction; Feb. 2007; 13 pgs.
Wang et al., Microwave digestion with HNO3/H2O2 mixture at high temperatures for determination of trace elements in coal by ICP-OES and ICP-MS; Analytica Chimca Act 514 (2004) pp. 115-124.

* cited by examiner

PRESSURE-RELEASE VESSEL WITH RIGID PROPORTIONAL LINER AND ASSOCIATED MICROWAVE-ASSISTED CHEMISTRY METHODS

BACKGROUND

The invention is an improved venting and sealing vessel for microwave-assisted chemistry methods such as acid digestion, solvent extraction, and synthesis.

The use of microwave radiation for microwave-assisted chemistry methods, such as acid digestion, solvent extraction, and synthesis, is generally well known to those skilled in the art.

The term "digestion" refers to several well-understood processes which reduce the compounds that make up the material into its constituent elements or more basic compounds. Commonly, the process is carried out by use of a solvent. At the end of digestion, the result is usually a colorless or nearly colorless solution that can be diluted and then tested using one or more quantitative analysis techniques. When using pressurized digestion techniques, the temperature of the process is elevated by carrying out the digestion in a sealed, heated container. This allows the reaction to reach temperatures above the atmospheric boiling point of the digestion solvent. This in turn also increases the rate of the chemical reactions that accomplish the digestion.

To attack the structure or matrix of a sample and reduce it to its elements or more basic compounds, acid digestion uses one or more strong acids, frequently at an elevated temperature, pressure, or both. In microwave-assisted acid digestion, microwave radiation is used to add energy to materials that are responsive to microwave radiation. Microwaves can assist in carrying out acid digestion faster, using less solvent, and at higher temperatures and pressures than more conventional heating methods. Because of the frequency and corresponding wavelength of microwave radiation assigned to laboratory use e.g., 2450 MHz or about 12 cm, microwave-assisted techniques are often carried out in closed vessels which are in turn placed inside a device that bears a superficial relation to a consumer microwave oven, but that is more sophisticated in its source, waveguide, cavity, and control elements.

The term "extraction" refers to the process of separating a desired substance (often an organic compound) when it is mixed with others often as sample preparation in advance of an analytical tool. Solvent extraction by traditional techniques consumes significant amounts of time and solvent and leaves open the possibility of contamination. Microwave-assisted, closed-vessel extraction can be used to prepare a number of samples concurrently using less time and smaller amounts of solvent than that required for conventional solvent extractions.

The term "synthesis" refers to the process of the execution of chemical reactions to obtain one or more products. Microwave-assisted, closed-vessel synthesis allows for rapid heating of reactants to high pressures and temperatures. The skilled person understands that, based on the Arrhenius Law, the rates of most chemical reactions are increased by heating the reaction mixture. Because most synthesis reactions require heating at some point, microwave heating can significantly reduce the reaction time and therefore overall production time. Using closed vessels together with microwave-assisted heating can reduce reaction time from days and hours to minutes or seconds.

At the temperatures commonly used for microwave assisted chemistry methods, the pressure in the vessel used is generated from two components. The first is the vapor pressure generated by a digestion or the synthesis components, or other gas-generating reactions. Such vapor pressures are generally predictable because they are based on the temperature of a known amount of a known composition. The second is the pressure of the gaseous by-products generated during the reaction process, which is generally less predictable, particularly in digestion or extraction, because it will be based on the size and composition of the sample. Consequently, the vessels used for microwave-assisted chemistry methods must be microwave transparent but offer the structural capabilities required to withstand unpredictable high pressures.

The skilled person will be familiar with the available methods for conducting microwave-assisted digestion, extraction, and synthesis. For example, one method for conducting digestion reactions inserts multiple reaction vessels inside of a large metal cavity reaction chamber secured with metal clamps, subjects them to high pressure from a gas such as nitrogen to seal the vessels, and then uses microwaves to heat the vessels to speed the chemical reactions. Recent example includes the Ultrawave Microwave Acid Digestion System (Milestone Inc., 25 Controls Drive, Shelton, Conn. 06484, https://milestonesci.com/utrawave-microwave-acid-digestion-system/(accessed Jan. 3, 2019)); and the Multiwave 7000 (Anton Paar, 3955 World Houston Parkway, Suite 170, Houston, Tex. 77032, https://www.anton-paar.com/us-en/products/details/microwave-digestion-system-multiwave-7000/(accessed Jan. 3, 2019)) have reasonably-sized footprints, but likewise use a metal cavity reaction chamber, high pressure gas to seal the reaction vessels, and microwaves to heat the vessels to speed the reactions. Thus, the user faces the same concerns and inconveniences and the same sample size or sample number constraints as with larger footprint instruments.

The structure and operation of devices such as the UltraWave or MultiWave demonstrate their weaknesses. The professed goal is, of course, to provide the user with a reaction vessel that is disposable, which in reality means that the vessel can be formed of the types and amounts of materials that can produce an inexpensive vessel so that the user finds it economically advantageous to use the vessel only once.

In order to accomplish this objective, these devices place the fragile vessels with their unsecured or lightly secured closures in a liquid bath (with water or a dilute acid being typical) inside of a metal bomb that is highly pressurized (e.g., 1500 to 3000 psi) with nitrogen. This high pressure holds the closures on the vessels while the microwaves heat the water. As a result, the compositions in the vessels are heated in a conventional conduction manner by the hot water rather than by any dipole interaction with the microwaves.

The high pressure creates a number of secondary issues. First the nitrogen pressure—a safety issue in and of itself—must be high enough to force and keep the vessels closed throughout the intended reaction without any venting whatsoever, because venting will cross-contaminate the vessels in the bomb.

As another disadvantage, the reaction vessel sizes must be relatively small. For example, a bomb with a volume of about 1 liter, can hold about 15 20 ml vessels or about 5 50 ml vessels. These small vessel sizes, however, exacerbate the pressure problems because of the inverse relationship between gas volume and gas pressure. Stated differently, as vessel size decreases, the pressure generated by any given reaction in the vessel will increase compared to a larger vessel under the same temperature conditions.

As yet another problem, because nitrogen pressure rather than mechanical pressure is used to close the fragile vessels, an extended cooling ramp time is required before the pressure can be released and the caps or closures removed from the vessels without cross contamination.

Other systems avoid the use of the high pressure, single reaction chamber and use an individual microwave-transparent pressure vessel for each sample. Microwave-transparent pressure vessels are commonly made from engineered plastics that can withstand relatively high pressures before failing. The nature of many engineered polymers is such, however, that if the vessel fails under pressure, it will tend to fail catastrophically. In order to avoid catastrophic failure, vessels for microwave digestion have been developed that include some means for pressure release. In some cases, the pressure release is provided by a small pathway leading from the interior to the exterior of the vessel with a small portion of the pathway blocked by a diaphragm that will fail at a predetermined pressure. When the pressure in such a vessel exceeds the predetermined limit, the diaphragm will burst and the gases will vent from the vessel without any catastrophic or near-catastrophic failure. Commonly assigned U.S. Pat. Nos. 6,258,329; 5,520,886; 5,427,741; 5,369,034 and 5,230,865 are representative of the diaphragm type of release system.

Vessels in which the pressure release is temporary rather than complete and which allow the reaction to continue during and after the pressure release have been developed. When the pressure in the vessel exceeds predetermined limits, such vessels vent a small amount of gas and reseal themselves once the pressure drops below the predetermined limit. Examples include commonly assigned U.S. Pat. Nos. 6,927,371; 6,287,526 and 6,136,276.

As a further improvement, commonly owned U.S. Pat. Nos. 10,065,168; 8,852,533 and 8,795,608 describe a fluoropolymer reaction vessel with a floating cap that allows for limited release of excessive pressure from the reaction vessel followed by resealing without permanent vessel damage or distortion. Each fluoropolymer reaction vessel is inserted in a reinforcing sleeve that provides the radial strength required to keep the reaction vessel intact under the high pressure created by the digestion reaction. The use of the sleeves with the reaction vessels eliminates the problems created by the large volume of the metal cavities used in some other methods. U.S. Pat. Nos. 10,065,168; 8,852,533, and 8,795,608 are incorporated entirely herein by reference.

The fluoropolymer reaction vessel needs to be cleaned, however, between uses because any chemical reaction will leave residual contamination in the vessel after completing the microwave-assisted method. This cleaning is time-consuming regardless of the corresponding advantages of the systems described in the 168, 533, and 608 patents. This results in the loss of efficiency in processing numerous samples daily. Microwave transparent, flexible film fluoropolymer liners (e.g., commonly assigned application Ser. No. 15/934,164 filed Mar. 23, 2018, published as No. 20190291070, for Vessel and Disposable Inner Sleeve for Microwave Assisted Reactions) having a size and shape that generally conform to the inner walls of the fluoropolymer reaction vessel, can eliminate the need to clean the reaction vessels. Introducing small or powder-like samples into a flexible liner, however, can prove cumbersome. Thicker-walled liners made of, e.g., glass simplify the introduction of a sample but increase expense and can be susceptible to break under the high pressure conditions created by digestion reactions. Furthermore, open-top liners allow the possibility that, as pressure inside the liner increases, the contents of the liner will escape the liner and will contaminate the reaction vessel.

Thus, a need continues to exist for a controlled release and self-resealing vessel assembly for high pressure, microwave-assisted chemistry methods that can use cost-effective rigid liners while avoiding breaking during high pressure reactions.

SUMMARY

The invention is a structural improvement in reaction vessel systems for microwave-assisted high temperature high-pressure chemistry that among other advantages offers dynamic venting and resealing while a reaction proceeds and eliminates the risk of cross contamination associated with systems that use a common pressurized chamber. The improvement includes a relatively thin-walled disposable liner cylinder.

In one aspect, the invention is a structural improvement for microwave-assisted high temperature high-pressure strong mineral acid digestion vessel systems that comprises a rigid liner cylinder that includes one closed end and one open end defining a mouth and a liner cap positioned in the mouth of the rigid liner cylinder for closing the rigid liner cylinder. The liner cap includes a depending column that seats against the inside diameter of said rigid liner cylinder and a disk at one end of the depending column that has a diameter sufficient to rest upon the rigid liner cylinder without falling into the rigid cylinder liner, and smaller than the inner diameter of the cylindrical reaction vessel. The liner cap can rest in the rigid liner cylinder at its mouth. The depending column has (i.e., defines) a passage that provides a gas venting space between the liner cap and the rigid liner cylinder.

In another aspect, the invention is a method of microwave-assisted high temperature high pressure chemistry that comprises adding a microwave-absorbing liquid to an interstitial space between two coaxially aligned and nested microwave-transparent reaction vessels in which the inner nested vessel contains one or more reaction compositions. The amount of microwave-absorbing liquid in the interstitial space is sufficient to generate a vapor pressure under microwave radiation that starts as being the same or greater (to a defined extent) than the vapor pressure of the reacting compositions under the same application of microwave radiation. The microwave-absorbing liquid does not otherwise interfere with the relevant compositions, starting materials, or end products, or with the reactions between or among them.

In another aspect, the invention is a vessel system for microwave-assisted high temperature high-pressure chemistry. In this aspect, the invention comprises a cylindrical reaction vessel formed of a polymer that is resistant to strong mineral acids at high temperatures and that is transparent to microwave radiation. The cylindrical reaction vessel has one closed end and one open end defining a mouth for cylindrical reaction vessel. The reaction vessel has a rigid liner cylinder positioned coaxially inside of the cylindrical reaction vessel. The rigid liner cylinder includes one closed end positioned adjacent the closed end of the cylindrical reaction vessel and one open end defining a rigid liner cylinder mouth below the cylindrical reaction vessel mouth. The outer diameter of the rigid liner cylinder together with the inner diameter of the cylindrical reaction vessel define an interstitial space between the cylindrical reaction vessel and the rigid liner cylinder. A cylindrical liner cap, formed of a microwave-transparent material, rests in the mouth of the rigid liner cylinder for closing the rigid liner cylinder. The cylindrical liner cap includes a depending cylindrical column that has a circumference that closely matches the inside diameter of said rigid liner cylinder and a passage along the cylindrical column to provide a gas venting space between the cylindrical column of the liner cap and the rigid liner cylinder. A disk at one end of the depending cylindrical column has a diameter larger than the outer diameter of said rigid liner cylinder and smaller than the inner diameter of said cylindrical reaction vessel so that the cylindrical liner cap can rest in a defined position at the mouth of the rigid liner cylinder. A microwave-transparent reaction vessel plug rests in the mouth of the cylindrical reaction vessel and above the mouth of the rigid liner cylinder and coaxially against the cylindrical liner cap. A female threaded cap engages male threads on the cylindrical reaction vessel at the mouth of the cylindrical reaction vessel and bears against the reaction vessel plug to exert an axial closing force and provide a pressure resistant closure for the vessel system. A microwave-transparent cylindrical reinforcing sleeve surrounds the cylindrical reaction vessel coaxially with both the cylindrical reaction vessel and the rigid liner cylinder for increasing the radial pressure resistance strength of the vessel system.

In another aspect, the invention is a method of microwave-assisted high temperature high pressure chemistry that comprises adding a microwave-absorbing liquid to an interstitial space between two coaxially aligned and nested microwave-transparent reaction vessels in which the inner nested vessel contains a digestion sample and an amount of mineral acid sufficient to digest the sample; closing the inner nested reaction vessel with a microwave-transparent cap that slides into the inner nested reaction vessel and that includes at least one pressure-activated dynamic passage from the inner nested vessel to the interstitial space; closing the outer nested reaction vessel with a pressure resistant cap connection to thereby increase the pressure capacity of the interstitial space; applying a closing force against the sliding cap in an amount sufficient to sufficient to withstand some vapor pressure created by the compositions in the inner nested reaction vessel under the application of microwave radiation while allowing venting at higher vapor pressures generated by the reaction compositions (e.g., a strong mineral acid and a digestion sample; an organic solvent for synthesis) at reaction temperatures; and applying microwave radiation to the reaction compositions inside of the inner nested reaction vessel and to the microwave-absorbing liquid in the interstitial space to thereby encourage the digestion of the sample in the acid while concurrently increasing the pressure in the interstitial space based on the increased vapor pressure or gaseous state of the microwave-absorbing liquid under the application of the microwave radiation. The amount of microwave-absorbing liquid in the interstitial space is sufficient to generate a vapor pressure under microwave radiation that bears against the sliding cap to exert an axial closing force under the same application of microwave radiation. The microwave-absorbing liquid does not otherwise interfere with the relevant compositions, starting materials, or end products, or with the reactions between or among them.

In another aspect, the invention is a vessel system for high-temperature high-pressure microwave assisted chemistry comprising a microwave transparent pressure releasing and resealing cylindrical reaction vessel nested coaxially inside of a microwave transparent pressure releasing cylindrical containment vessel with a small annular interstitial space between and defined by the nested reaction vessel and the nested containment vessel.

As used herein the term "nest" and its past tense "nested" are used in their dictionary sense which can be variously understood as, "an assemblage of things lying or set close together or within one another, . . . to fit or place one within another, . . . to fit together or within one another as boxes, pots, and pans, dishes, small tables or the like." Lawrence Urdang and Stuart Flexner, *The Random House College Dictionary*, 1972, Random House Inc.

The foregoing and other objects and advantages of the invention will become clearer based on the following detailed description in conjunction with the accompanying drawings.

DETAILED DESCRIPTION

The invention is a vessel system for microwave-assisted, high temperature, high-pressure chemistry methods.

In contrast to the small numbers of small vessels used in the bomb-type instruments, the invention typically uses sets of 40 vessels that are each between 50 and 75 mL in volume, or up to 24 vessels that are 100 ml in volume.

Figure 1:
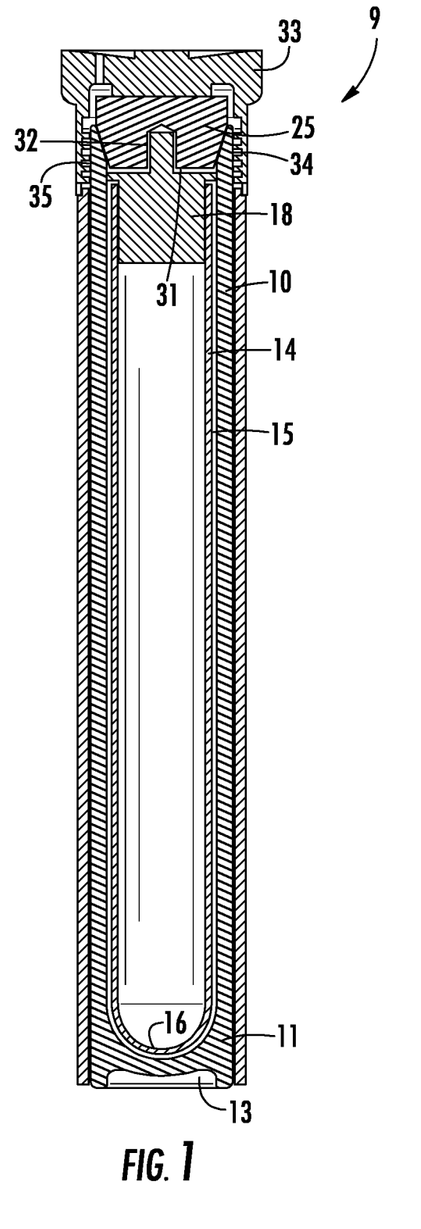
FIG. 1 is a cross-sectional view of a vessel system according to the present invention.
Figure 2:
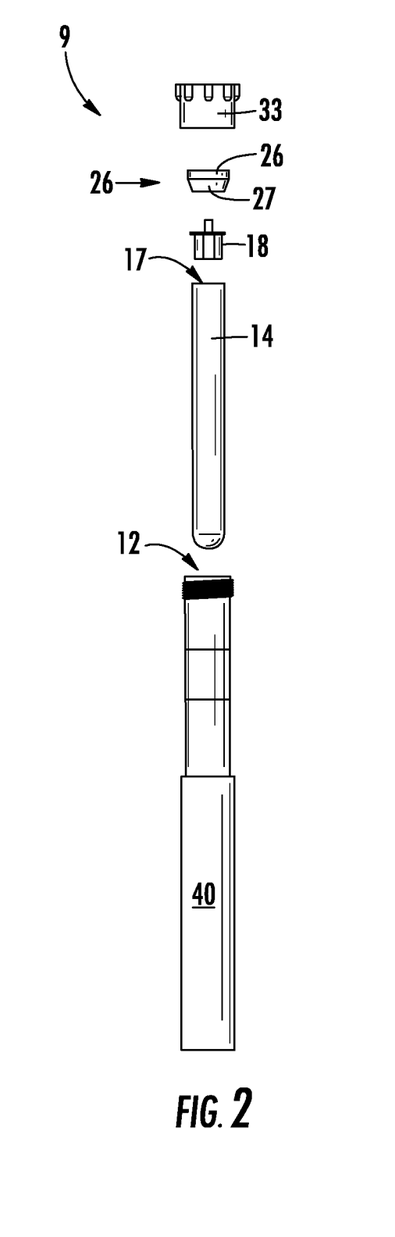
FIG. 2 is an exploded view of FIG. 1.

FIG. 1 is a cross-sectional view, and FIG. 2 is an exploded elevational view, of a vessel system according to the present invention. As illustrated in FIG. 1, the vessel system is broadly designated at 9 and includes a cylindrical reaction vessel 10 formed of a polymer that is resistant to relevant solvents such as strong mineral acids for digestion reactions or organic solvents for extraction and synthesis reactions. at high temperatures and that is transparent to microwave radiation and infrared radiation. Typical embodiments will be of fluoropolymers such as polytetrafluoroethylene ("PTFE") and equivalents. "High temperature" generally refers to a temperature above room temperature that will successfully drive the intended reaction more rapidly in the selected solvent and under an increased pressure (i.e., above atmospheric pressure) generated by the heated solvent. In general, no need exists to raise the temperature in some unlimited fashion.

The cylindrical reaction vessel 10 has a closed end 11 and an open end 12. In the illustrated embodiment at the closed end of the cylindrical reaction vessel 10, the outer surface of the cylindrical reaction vessel 10 is longer than the inner surface of the cylindrical reaction vessel 10. Consequently, if the cylindrical reaction vessel 10 is resting on a flat surface on its closed end, only the outer circumferential edges of the closed end of the cylindrical reaction vessel 10 touch the surface on which the cylindrical reaction vessel 10 rests while the center of the cylinder does not touch the surface. The recess 13 at the bottom of the cylindrical reaction vessel 10 serves as an infrared window so that an infrared device (not shown) can read the temperature of the reaction taking place in the cylindrical reaction vessel 10. The open end 12 defines a mouth for the reaction vessel 10.

A rigid liner cylinder 14, which in the illustrated embodiment broadly resembles a test tube, nests coaxially inside the cylindrical reaction vessel 10. The rigid liner cylinder 14 has an outer diameter that together with the inner diameter of the cylindrical reaction vessel 10 defines an interstitial space 15 between the cylindrical reaction vessel 10 and the rigid liner cylinder 14. The rigid liner cylinder will be typically formed of a material that is rigid, transparent to microwave radiation and infrared radiation, chemically inert, and optically clear. It will be typically selected from the group consisting of glass, quartz, and equivalents.

The rigid liner cylinder 14 has one closed end 16 positioned adjacent to the closed end 11 of the cylindrical reaction vessel 10 when the rigid liner cylinder 14 is nested in the cylindrical reaction vessel 10. The rigid liner cylinder 14 has one open end 17 that defines a mouth positioned below the mouth of the cylindrical reaction vessel 10 when the rigid liner cylinder 14 is nested in the cylindrical reaction vessel 10. A cylindrical liner cap 18 fits in the mouth of the rigid liner cylinder 14 and closes the rigid liner cylinder 14. The cylindrical liner cap 18 is formed of a polymer that is resistant to strong mineral acids at high temperatures and that is transparent to microwave radiation.

Figure 3:
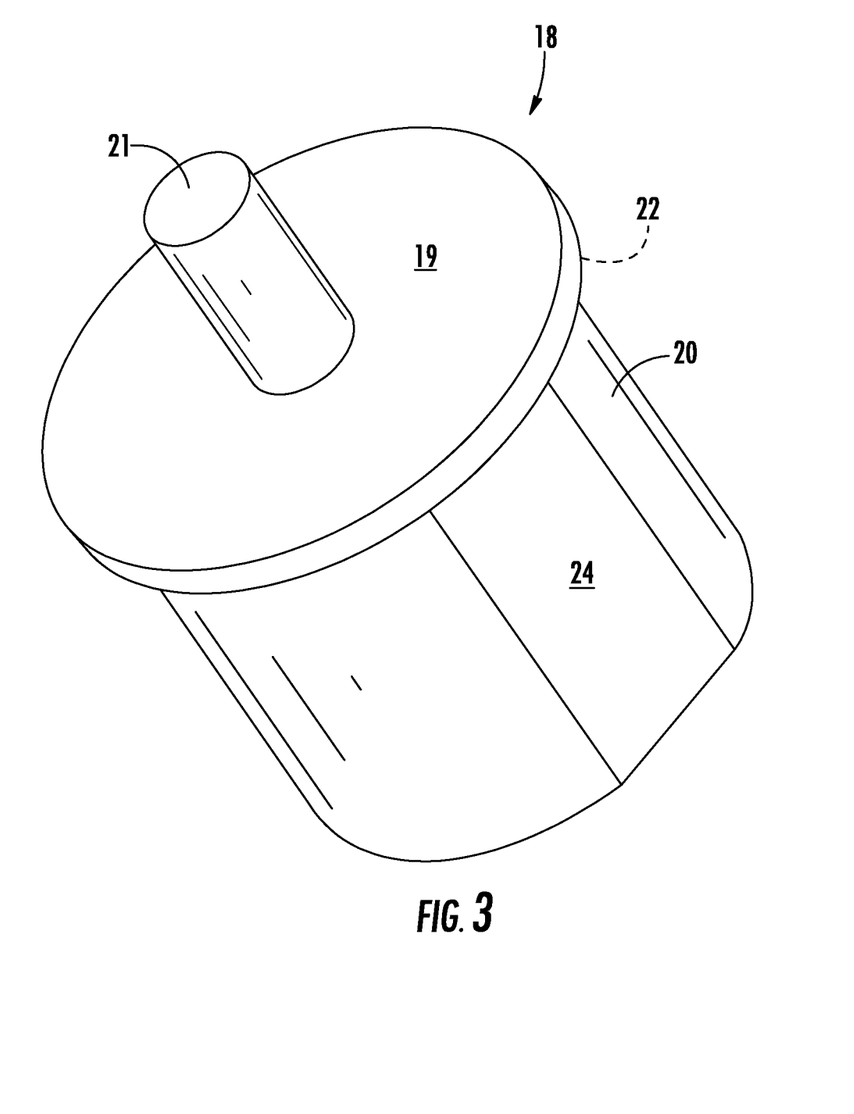
FIG. 3 is a perspective view of the liner cap illustrated in FIGS. 1 and 2.

FIG. 3 offers a perspective view of the liner cap 18. As depicted in FIG. 3, the liner cap 18 includes a disk 19, a depending cylindrical column 20, and a cylindrical knob 21. The depending cylindrical column 20 on the bottom face 22 of the disk 19 has a circumference that closely matches the inside circumference of the rigid liner cylinder 14 so that the depending cylindrical column 20 engages the inside of the rigid liner cylinder 14, but can still slide into the rigid liner cylinder 14. The disk 19 has a diameter larger than the outer diameter of the rigid liner cylinder 14 and smaller than the inner diameter of the cylindrical reaction vessel 10 so that the liner cap 18 can rest in a defined position in the rigid liner cylinder 14 at the mouth of the rigid liner cylinder 14. In the illustrated embodiment, the disk 19 rests on the circumferential edge of the rigid liner cylinder 14 and the depending cylindrical column 20 slides into and rests at the mouth of the rigid liner cylinder 14. A cylindrical knob 21 extends from the top face 23 of the disk 19 and is oriented coaxial with the depending cylindrical column 20. The cylindrical knob 21 has a diameter smaller than that of the disk 19 and the depending cylindrical column 20 and facilitates digital removal of the cylindrical liner cap 18 from the rigid liner cylinder 14.

The liner cap 18 includes a passage 24 that in the illustrated embodiment is oriented axially along the circumferential edge of the depending cylindrical column 20, and as further illustrated in the embodiment depicted in FIG. 3, is a flat oblique chamfered portion along the depending cylindrical column 20. The passage 24 provides a space for gases emitted from a chemical reaction in the rigid liner cylinder 14 to vent between the depending cylindrical column 20 and the rigid liner cylinder 14.

Above and coaxially with the cylindrical liner cap 18 and the rigid liner cylinder 14, a microwave-transparent reaction vessel floating plug 25 rests in the mouth of the cylindrical reaction vessel 10. In the embodiment illustrated in FIG. 1, the reaction vessel floating plug 25 has a cylindrical portion 26 that has a diameter equal to or slightly larger than the interior diameter of the mouth of the cylindrical reaction vessel 10. Consequently, the cylindrical portion of the reaction vessel floating plug 26 rests on the circumferential edge of the cylindrical reaction vessel 10 at the mouth of the cylindrical reaction vessel 10. In the embodiment illustrated in FIG. 1, the reaction vessel floating plug 25 has a lower frustoconical portion 27. The cylindrical reaction vessel 10 has a beveled lip 30 at its open end 12 to allow the frustoconical portion 27 of the reaction vessel floating plug 25 to rest in the mouth of the cylindrical reaction vessel 10 above the cylindrical liner cap 18 and which, in the embodiment illustrated in FIG. 1, leaves a small interstitial space 31 between the reaction vessel floating plug 25 and the cylindrical liner cap 18. The function of this interstitial space 31 will be described and clarified with respect to the method embodiments and other drawings. As used herein and as set forth in U.S. Pat. No. 8,852,533, the word "floating" means that the plug 25 is placed in a resting relationship with respect to the reaction vessel 10 and the beveled lip 30 without any direct mechanical advantage between and among the reaction vessel floating plug 25 and any other part of the vessel system 9.

The bottom of the frustoconical portion 27 of the reaction vessel floating plug 25 includes a small cylindrical notch 32 that is coaxial with the reaction vessel floating plug 25. This cylindrical notch 32 allows the cylindrical knob 21 on the cylindrical liner cap 18 to nest inside the notch 32.

Above the reaction vessel floating plug 25, a reaction vessel cap 33 has female threads 34 that engage male threads 35 on the outside of the top portion of the cylindrical reaction vessel 10. When the female threads 34 and the male threads 35 are fully engaged, the reaction vessel cap 33 bears against the reaction vessel floating plug 25 to provide a pressure resistant closure for the vessel system 9 illustrated in FIG. 1. As set forth in U.S. Pat. No. 8,852,533, the reaction vessel floating plug 25 is held in place by the response of the reaction vessel cap 33. The top 36 of the reaction vessel cap 33 contains a vent opening 37, the operation of which will be described and clarified in respect to other elements of the vessel system 9.

FIG. 2 illustrates that the vessel system 9 is inserted coaxially into a microwave-transparent cylindrical reinforcing sleeve 40 in order to provide additional radial pressure resistance strength of the vessel system 9. Because the reinforcing sleeve touches neither the sample nor the mineral acids, it can be selected and formed from materials that offer the best combination of weight, strength, and cost factors. As set forth in (for example) commonly assigned U.S. Pat. No. 6,927,371, multiple layers of high strength fibers molded into a high strength polymer provides a composite structure that has both the strength of the molded polymer, together with the flexibility and break resistance of the high strength fibers. The contents of U.S. Pat. No. 6,927,371 are incorporated entirely herein by reference.

Figure 6:
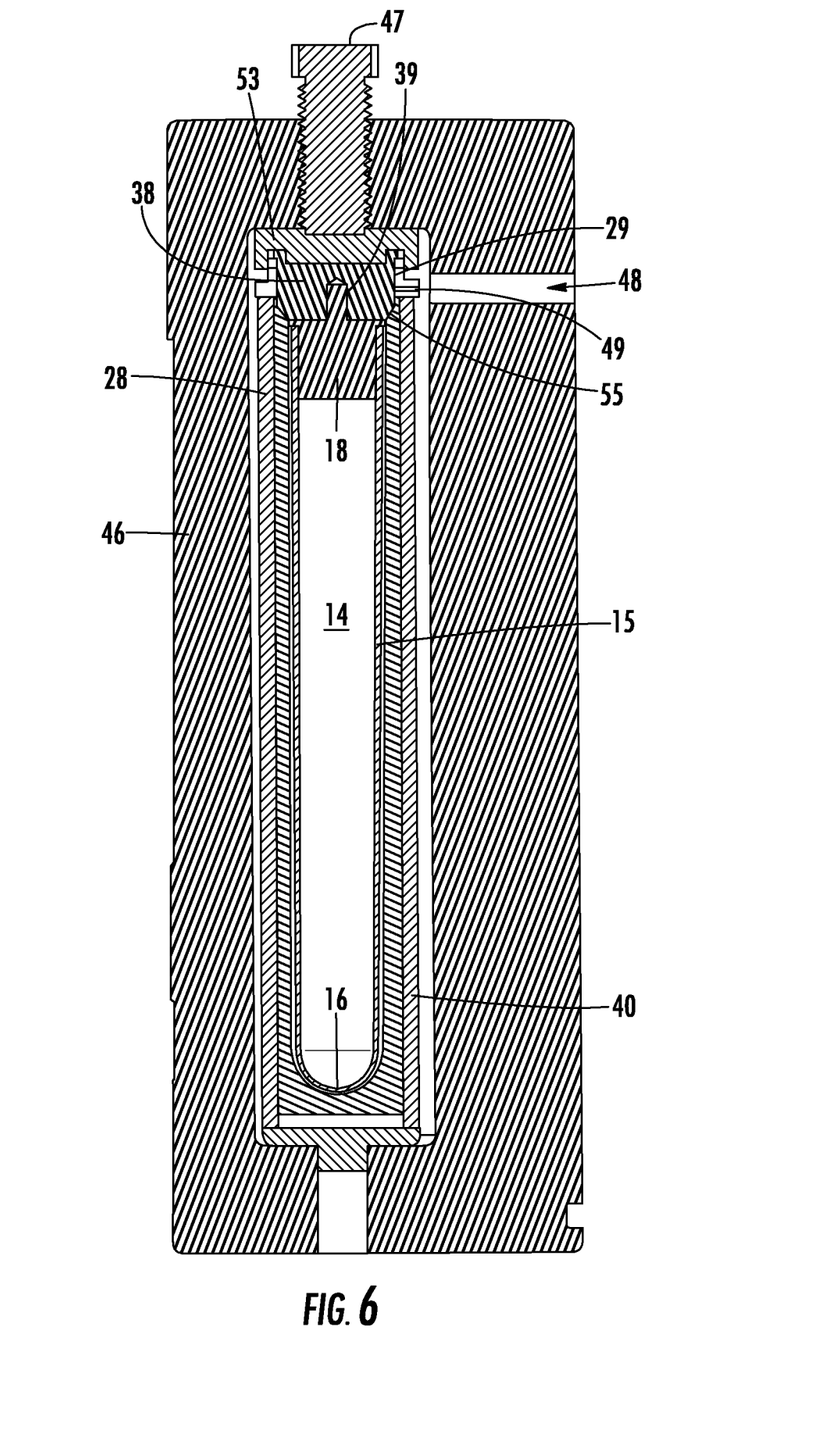
FIG. 6 is a cross-sectional view of vessel system including a rigid liner cylinder nested in a plugged polymer cylinder reaction vessel with a pressure vent opening extending radially through the wall of the reaction vessel and a supporting frame.
Figure 7:
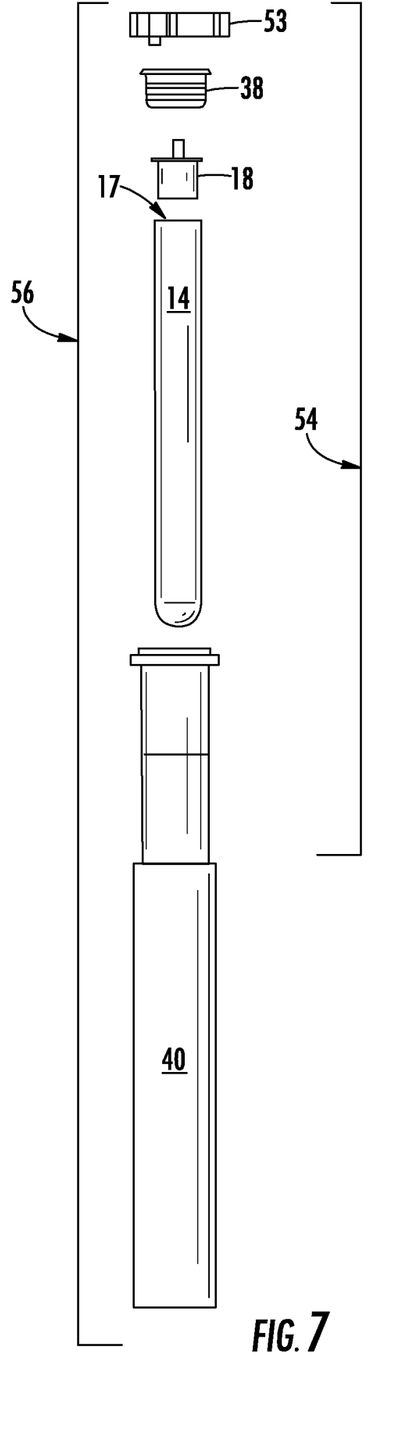
FIG. 7 is an exploded elevational view of a vessel system including a rigid liner cylinder and a plugged polymer cylindrical reaction vessel, and a reinforcing sleeve.
Figure 8:
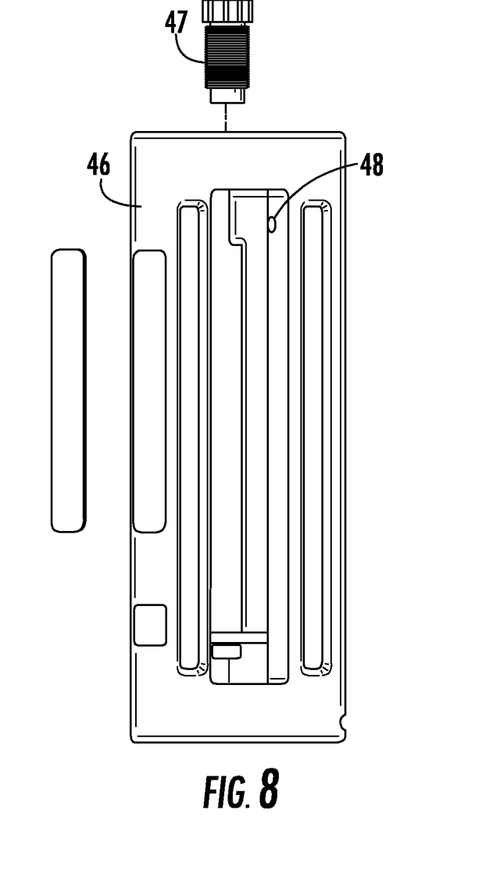
FIG. 8 is an exploded view of a supporting frame.

In the embodiment illustrated in FIG. 6, the rigid liner cylinder 14 is nested in a plugged polymer cylinder reaction vessel 28 which is described in commonly owned application Ser. No. 15/447,250 filed Mar. 2, 2017, published as U.S. Pub. No. 2017/0312728 for High Temperature Pressure Digestion Vessel System with Dual Action Seal, and which is entirely incorporated herein by reference (hereinafter Application '250). As in the reaction vessel 10, the rigid liner cylinder 14 has a diameter that together with the inner diameter of the reaction vessel 28 defines an interstitial space 15 between the reaction vessel 28 and the rigid liner cylinder 14. A closure plug 38 rests over the liner cap 18. The closure plug 38 rests in the mouth 29 of the reaction vessel 28. A small cylindrical notch 39, in and coaxial with the closure plug 38, allows the cylindrical knob 21 on the liner cap 18 to nest in the closure plug 38. A cap 53, fits over the closure plug 38, and the sides of the cap 53 girdle the outside of the upper rim of the mouth 29 of the reaction vessel 28. FIG. 7 illustrates that the entire vessel system 54 is, in turn, nested in a reinforcing sleeve 40. The entire vessel assembly 54, inside its reinforcing sleeve 40, fits inside a flexible frame 46 that includes a vertically oriented bolt 47 that is threaded and turned through the top of the frame to exert an axial force against the cap 53.

The reaction vessel 28 has a circumferential tapered portion 55, near but not at the vessel mouth, which matches the circumferential tapered portion of the closure plug 38 when the closure plug 38 rests in the mouth of the reaction vessel 28. The mouth of the liner cylinder 14 rests at the base of this tapered portion. Similar to the floating plug 25 in reaction vessel 10, the closure plug 38 rests in the mouth of the reaction vessel 28 leaving a small interstitial space 31 above the liner cap 18. As set forth in detail in the 250 application, at excess pressure the closure plug 38 will push axially in the reaction vessel 28. This causes the frame 46 to flex and in turn creates a small gap between the tapered sections of the plug and the upper portion of the reaction vessel 28. The upper portion of the plug remains in contact with the upper portion of the reaction vessel 28 above the tapered portion 55 of the reaction vessel 28. This allows venting to take place through the radial vessel vent opening 49 just below the mouth 29 of the reaction vessel 28. This vent opening 49 is oriented to coincide with the radial frame vent tube 48 to allow excess gas to be released into the atmosphere. The function of the interstitial space 31 will be described and clarified with respect to the method embodiments and other drawings.

The skilled person will understand that shapes other than cylinders can serve for the reaction vessels and liners. Such different shapes, however, will add complexity, and thus cost, and as a result will tend to reduce the possibility that the liner can be used for a single test and then disposed of. Cylindrical vessels and liners also have certain strength advantages. Nevertheless, it will be understood that picking a different shape (e.g., cross section) for one or both vessels (e.g., hexagon, octagon, decahedron, dodecahedron) could be made to work.

In the figures, the liner cap 18 is illustrated as having a depending cylindrical column with the passage likewise being illustrated as a flat chamfered portion 24 that replaces an arc along the circumference of the depending cylindrical column.

A cylinder is a straightforward shape for the depending column, but other shapes can be incorporated provided they eliminate axial degrees of freedom when the cap is inserted into the rigid liner cylinder. Typically, eliminating the axial degrees of freedom will require at least three points of contact between the depending column and the inner circumference of the rigid liner cylinder, and obviously could include more than three points of contact depending upon design choices. In exemplary embodiments the points of contact will self-center the depending column.

Similarly, the oblique chamfered edge is a highly efficient venting passage for purposes of manufacture, pressure release, and cleaning Nevertheless, the skilled person will understand that the passage could have a more complex design, such as a bore hole through portions of the cap to provide a gas passage from the reaction space to the interstitial space. Again, although possible and within the invention, such complexities add in turn to the complexities of manufacture and use, and, perhaps most importantly, the ease of cleaning.

In another aspect, the invention is a method of microwave-assisted high temperature high pressure strong mineral acid digestion. In this embodiment, the invention includes the steps of placing a digestion sample and an amount of mineral acid sufficient to digest the sample in the rigid liner cylinder 14, nesting the rigid liner cylinder 14 coaxially in the cylindrical reaction vessel 10, introducing a microwave-absorbing liquid, for example, hydrogen peroxide, to the interstitial space 15, closing the rigid liner cylinder 14 by sliding the cylindrical liner cap 18 into the rigid liner cylinder 14, closing the cylindrical reaction vessel 10 with the reaction vessel floating plug 25, placing the reaction vessel cap 33 on the reaction vessel 10 and engaging the female threads 34 of the reaction vessel cap 33 with the male threads 35 of the reaction vessel until the reaction vessel cap 33 bears against the reaction vessel floating plug 25, placing the vessel system 9 into the reinforcing sleeve 40, applying microwave radiation to the contents of the vessel system 9 including the digestion sample, the strong mineral acid inside the rigid liner cylinder 14, and the microwave-absorbing liquid in the interstitial space 15, measuring the temperature of the digestion reaction inside the rigid liner cylinder 14 based on the infrared radiation emitted from the reaction and through the rigid liner cylinder 14 and the reaction vessel 10, and moderating the application of microwaves to the contents of the vessel system 9 based on the measured temperature.

The floating plug 25, the male threads 35 and the female-threaded reaction vessel cap 33 thus form a pressure-resistant closure connection.

The microwave-absorbing liquid added to the interstitial space 15 does not otherwise interfere with the composition in the rigid liner cylinder 14.

The amount of microwave-absorbing liquid in the interstitial space is sufficient to generate a vapor pressure under microwave radiation that at reaction temperatures defines a pressure in the interstitial space that bears against the sliding cap while the same microwave radiation drives a reaction within the inner nested rigid liner cylinder 14. As the skilled person will recognize, knowing the composition in the rigid liner cylinder, the skilled person can closely estimate the amount of pressure the chemistry method will generate. The skilled person can then calculate or at least safely estimate the amount of microwave-absorbing liquid required to raise the pressure in the interstitial space 15 to initially exceed the pressure in the rigid liner cylinder 14 based upon well-understood relationships of the ideal gas law or (if desired) those versions of the gas law that are somewhat more refined.

For example, typically, for digestion, the method is carried out by adding between about 0.4 and 0.6 grams of the digestion sample and between about 8 and 12 mL of the strong mineral acid to the liner cylinder 14 with a volume of between about 60 and 90 mL and adding between about 2 and 6 mL of hydrogen peroxide to the interstitial space.

The vapor pressure exerted in the interstitial spaces 15 and 31 by the hydrogen peroxide or other microwave-absorbing liquid serves purposes which the skilled person understands. First, it increases the overall pressure in the reaction vessel 10 outside of the rigid liner cylinder 14, thereby raising the boiling point of the digestion acid and maintaining a liquid phase for digestion, and thereby speeding the digestion of the sample. Second, the vapor pressure pushes down axially on the cylindrical liner cap 18 allowing the internal liner pressure to increase and preventing vaporized acid and sample from escaping into the interstitial spaces 15 or 31 until the pressure inside the liner cylinder 14 exceeds the pressure in the interstitial spaces 15 and 31 allowing the liner cylinder 14 to burp, releasing that pressure into the interstitial space. Third, because the cylindrical liner cap 18 is at a somewhat lower temperature than the reaction mixture, acid vapor condenses on the surface of the cylindrical liner cap 18 inside the rigid liner cylinder 14 and drips back down into the rigid liner 14 to rejoin and encourage the digestion.

The cylindrical liner cap 18, like the plug 25, is "floating" meaning that it is placed in a resting relationship with respect to the rigid liner cylinder without any direct mechanical advantage between and among the cylindrical liner cap 18 and any other part of the vessel system 9.

As an advantage over (for example) nitrogen pressurized chambers, the hydrostatic pressure in the interstitial spaces 31 helps maintain the liner cap 18 in place on the liner cylinder 14 where the chemical reaction is taking place, eliminates the risk of cross contamination, and eliminates the need for the nitrogen overpressure and all the associated fittings and supplies. As an additional advantage, the cylindrical shape of the liner cylinder 14 is particularly well suited to withstand the external pressure exerted by the hydrostatic pressure in the interstitial space 15. Furthermore, because of its high compressive strength both radially and axially, even thin glass can be used to form the liner cylinders 14 which minimizes the cost of the liner cylinders 14 and allows them to be consumable.

While the digestion reaction is ongoing, because the cylindrical liner cap 18 provides at least one pressure-activated dynamic passage from the rigid liner cylinder 14 to the interstitial space (in the present embodiment, the chamfered portion 24 of the depending cylindrical column 20), if the vapor pressure inside the rigid liner cylinder 14 exceeds the vapor pressure exerted on the cylindrical liner cap 18 by the vapor pressure of the microwave-absorbing liquid in the interstitial space 15, the disk 19 of the cylindrical liner cap 18 will lift off the circumferential edge of the rigid liner cylinder 14 and allow some gases to escape the rigid liner cylinder 14 thereby reducing the pressure inside of the rigid liner cylinder 14. Thereafter, while the digestion reaction is continuing to progress, the vapor pressure of the microwave-absorbing liquid bearing against the cylindrical liner cap 18 will reseat the cap 18 and the disk 19 will again rest on the circumferential edge of the rigid liner cylinder 14.

The reaction vessel cap 33, when threaded, applies a closing force against the reaction vessel floating plug 25 sufficient to withstand the vapor pressure of the strong mineral acid at digestion temperatures. It thereby provides a pressure resistant cap connection to increase the pressure capacity of the interstitial space. When the pressure inside the reaction vessel 10 exceeds a mechanically defined set point, the top 36 of the reaction vessel cap 33 can flex to allow the reaction vessel floating plug 25 to move slightly and release gas pressure from the reaction vessel 10 while the digestion reaction continues. The excess gas can then vent through the vent opening 37. In some embodiments the flexibility of the top 36 of the reaction vessel cap 33 defines the pressure release set point, while in other embodiments (e.g. U.S. Pat. No. 6,927,371), the vessel system 9 is clamped inside of a slightly flexible frame, and a bolt or other clamp bears down (to an amount desired by the user) on the flexible portion 36 of the reaction vessel cap 33 to define the pressure exerted and thus the pressure at which gas will escape. In the embodiment illustrated in FIG. 6, the bolt 47 bears on the cap 53 to keep the reaction vessel 28 sealed so that excess gas vents through the vessel vent opening 49 and the frame vent tube 48. In any case, the reaction vessel remains closed during the entire digestion reaction and is vented without otherwise opening the reaction vessel.

As a point of confirming clarification, when the vessel is used in a frame, the frame may exert force against the plug, but this force is not exerted against the liner cap in the rigid liner cylinder.

The skilled person will understand that the cylinder liner 14, the liner cap 18, and the interstitial space 15 and 31 will serve the same or similar purposes in reaction vessels 10 or 28 and in other high temperature, high pressure chemistry methods such as extraction or synthesis.

As an advantage over, e.g., nitrogen-pressurized chambers, each reaction vessel 10 or reaction vessel 28 in the present claimed invention vents to the atmosphere through vent opening 37 or vent opening 49 rather than to a common pressurized chamber. Thus, the present claimed invention eliminates the risk of cross contamination associated with systems such as the Multiwave 7000 or the Ultrawave which use a common pressurized chamber.

As a further advantage over, e.g., nitrogen-pressurized chambers, the claimed invention creates pressure by heating the liquid in the interstitial space 15 and 31 in each reaction vessel 10 or reaction vessel 28 and thus eliminates the need for a pressurized gas source to pre-pressurize a common chamber. This reduces the costs associated with putting a large volume chamber under high pressure.

Moreover, the claimed invention eliminates the risk associated with a large chamber under high pressure. Because the risk associated with high pressure increases as volume increases, the present invention's use of the interstitial space 15 and 31 to create pressure rather than a large common chamber effectively eliminates the risk.

As a result of eliminating the hazards associated with a large chamber under high pressure, the claimed invention eliminates the concomitant limit on the number of samples that can be run simultaneously. Because each reaction vessel 10 or reaction vessel 28 is only, for example, 110 mL in volume, over 40 samples can be safely run simultaneously.

The invention can also be described as a microwave transparent pressure releasing and resealing cylindrical reaction vessel 14, for which glass or quartz are particularly appropriate, nested coaxially inside of a microwave transparent pressure releasing and resealing cylindrical containment vessel 10, for which a fluoropolymer is particularly appropriate, with a small annular interstitial space 15 between and defined by the reaction vessel 14 and the containment vessel 10.

Considered in this aspect, the coaxially nested cylindrical reaction vessel 14 is closed by the sliding cap 18, and the coaxially nested cylindrical containment vessel 10 is closed by the floating plug 25 and the threaded flexible cap 33 on the containment vessel 10 that bears against the floating plug 25, and with the floating plug 25 bearing coaxially against the sliding cap 18.

In operation, and with or without the microwave absorbing liquid in the interstitial space 15, this arrangement defines both the force magnitude with which the vessels are closed, and in turn the pressures at which they will vent and reseal. Thus, excess pressure in the reaction vessel 14 will drive the sliding cap against the floating plug 25 with a force greater than the mechanical force originally applied, in turn allowing venting to take place until the forces equilibrate and the sliding cap 18 recloses the reaction vessel 14.

In an analogous manner, when the pressure outside of the reaction vessel 14, but inside of the containment vessel 10, exceeds the mechanical force applied by the threaded cap 33 against the floating plug 25, the floating plug will open the containment vessel to allow pressure to escape until the system again reaches a state of equalized forces.

Figure 5:
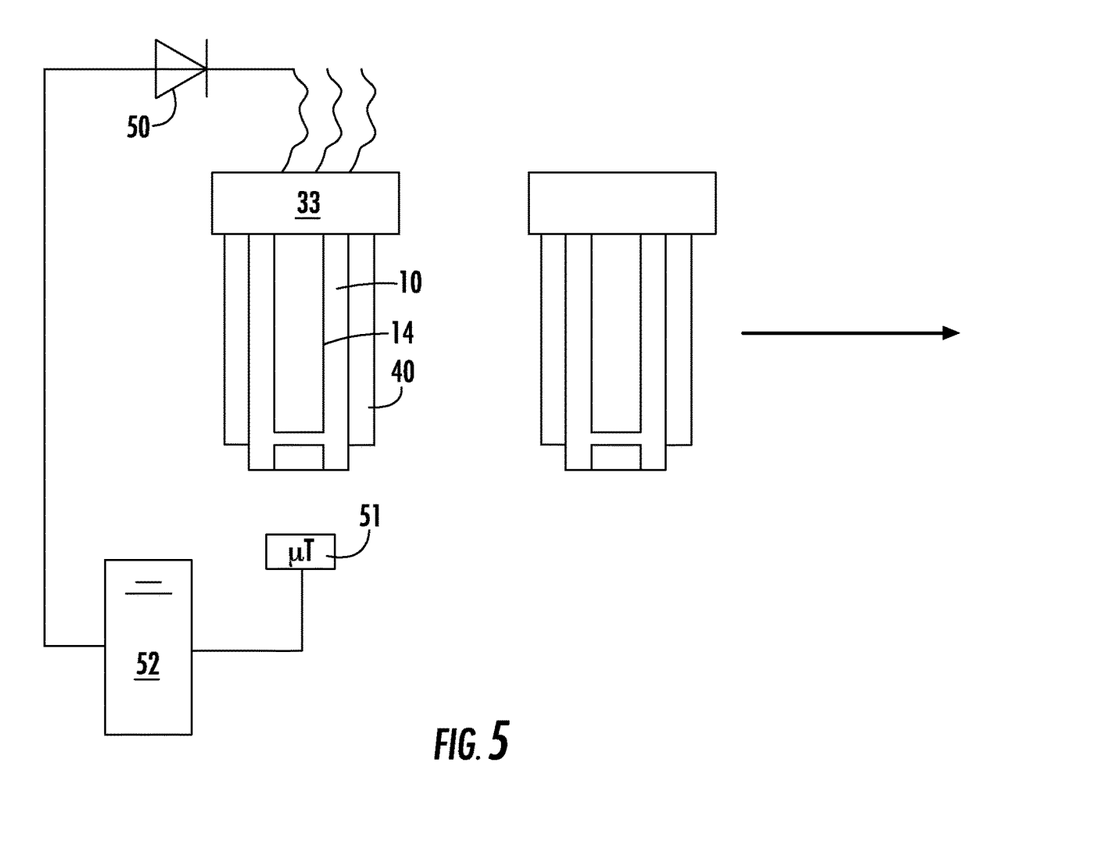
FIG. 5 is a schematic view of the method of microwave-assisted, high temperature, high pressure strong mineral acid digestion according to the present invention.

FIG. 5 is a schematic of the method embodiment. As set forth in the commonly owned application Ser. No. 15/934,164 filed Mar. 23, 2018, published as 20190291070, for Vessel and Disposable Inner Sleeve for Microwave Assisted Reactions, entirely incorporated herein by reference, a strong mineral acid and the digestion sample along with the microwave-absorbing liquid in the interstitial space are heated in a vessel liner with microwave radiation from the microwave source 50. The microwave source 50 is typically a magnetron, but could include a klystron or an IMPATT diode. The infrared (IR) detector 51 measures the temperature of a digestion reaction in the rigid liner cylinder 14 based on infrared radiation emitted from the digestion reaction in the rigid liner cylinder 14 and through the recess 13. As depicted in FIG. 5, the IR detector measures the temperature of a plurality of reactions inside a plurality of vessel systems 9 as the vessel systems 9 are moved successively over the IR detector 51.

The IR detector 51 measures wavelengths (frequencies) to which both the rigid liner cylinder 14 and the cylindrical reaction vessel 10 are transparent. For example, fluorinated polymers are transparent within the region (approximately) of 1000 nm-7.50 micron. Thus, the IR detector measures wavelengths within some or all of the 1000 nm-7.50 µm range. By using the infrared radiation emitted by the digestion reaction to which the rigid liner cylinder 14 and the cylindrical reaction vessel 10 are transparent, the IR detector measures the temperature of the reaction solution itself instead of reading the temperature of the cylindrical reaction vessel 10 or the rigid liner cylinder 14.

The method further comprises employing the processor (CPU) 52, in communication with the microwave source 50 and the IR detector 51, to moderate the application of microwaves from the microwave source 50 to the rigid liner cylinder 14 nested in the cylindrical reaction vessel 10 based on the temperature of the digestion reaction in the rigid liner cylinder 14 measured using the IR detector 51.

The method can further comprise the steps of opening the reaction vessel, typically after cooling to near ambient temperature (to allow the interior pressure to subside), removing the acid and the digestive sample from the rigid liner cylinder 14 and removing the rigid liner cylinder from the reaction vessel 10, and thereafter adding a new rigid liner 14 to the reaction vessel 10 without any intervening step or otherwise cleaning the reaction vessel 10.

The method further comprises the steps of repeating the entire digestion process with microwaves and temperature measurement for a new sample in the new liner.

As set forth in commonly owned application Ser. No. 15/934,164, the strong mineral acids are typically selected from the group consisting of nitric, sulfuric, hydrofluoric, and hydrochloric, as well as mixtures of two or more of these acids.

In order to work with these acids, the reaction vessel 10 can be formed from PFA, FEP or PVDF, or additionally from PTFE, or from any other polymer that otherwise can withstand the expected pressure and temperatures, and the corrosive aspects of the strong mineral acids.

The cylindrical liner cap 18 is formed of a polymer that is resistant to strong mineral acids at high temperatures and transparent to microwave radiation selected from the group consisting of polytetrafluoroethylene (PTFE, TEFLON®), polychlorortrifluoroethylene (PCTFE, KEL-F®), polyvinylidene fluoride (PVDF, KYNAR®, SYMALIT®), poly (ethylene chlorotrifluoroethylene) (ECTFE, HALAR®), chlorinated Polyvinyl Chloride (CPVC), polyethylene terephalate G copolymer (PETG/PET), polycarbonate (PC), perfluoroalkoxy (PFA), fluorinated ethylene propylene (FEP), and ethylene-tetrafluoroethylene (ETFE), and equivalents.

Figure 4:
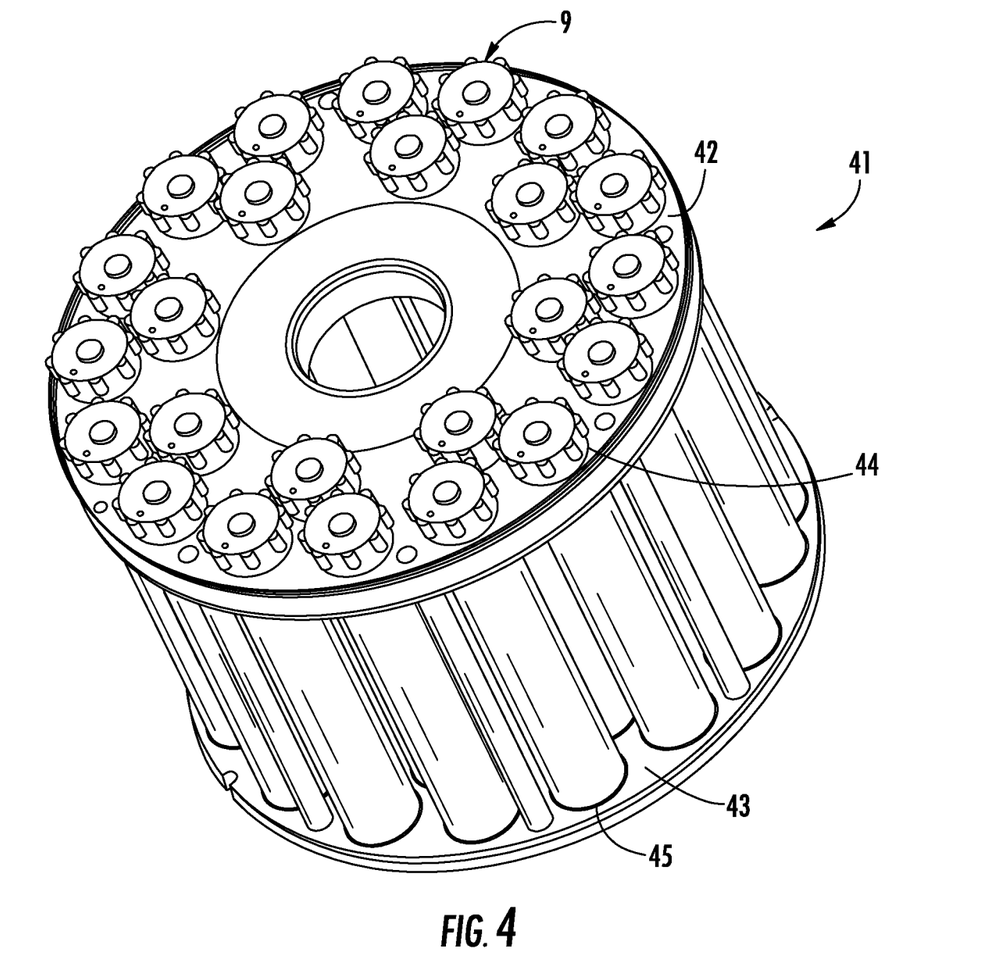
FIG. 4 is a perspective view of a turntable containing a plurality of the vessel systems illustrated in FIGS. 1 and 2.

FIG. 4 is a perspective view of a plurality of vessel systems 9 positioned in a turntable 41 defined by upper 42 and lower 43 racks. As set forth in commonly owned U.S. Pat. No. 8,852,533, incorporated entirely herein by reference, the vessel systems 9 are placed in openings 44, 45 in the racks 42, 43 and move in an orbital path around the center of the turntable 41 as the turntable rotates within a microwave cavity during the digestion process.

The rotation of the turntable 41 containing the vessel systems 9 provides the advantage of being able to carry out a number of digestions at the same time in the same cavity while also accommodating the standing node nature of microwaves in cavities of the size and shape into which the turntable 41 and the vessel systems 9 will fit.

The openings 44, into which the vessel systems fit in the lower rack 42, allow the lower part of each vessel system 9 to be exposed. Applying the method as depicted in FIG. 5, rotating of the turntable allows the vessel systems 9 to move across the IR detector 51 successively to obtain frequent temperature measurements and allows the processor 52 to adjust the microwave source 50 accordingly as previously described.

Figure 9:
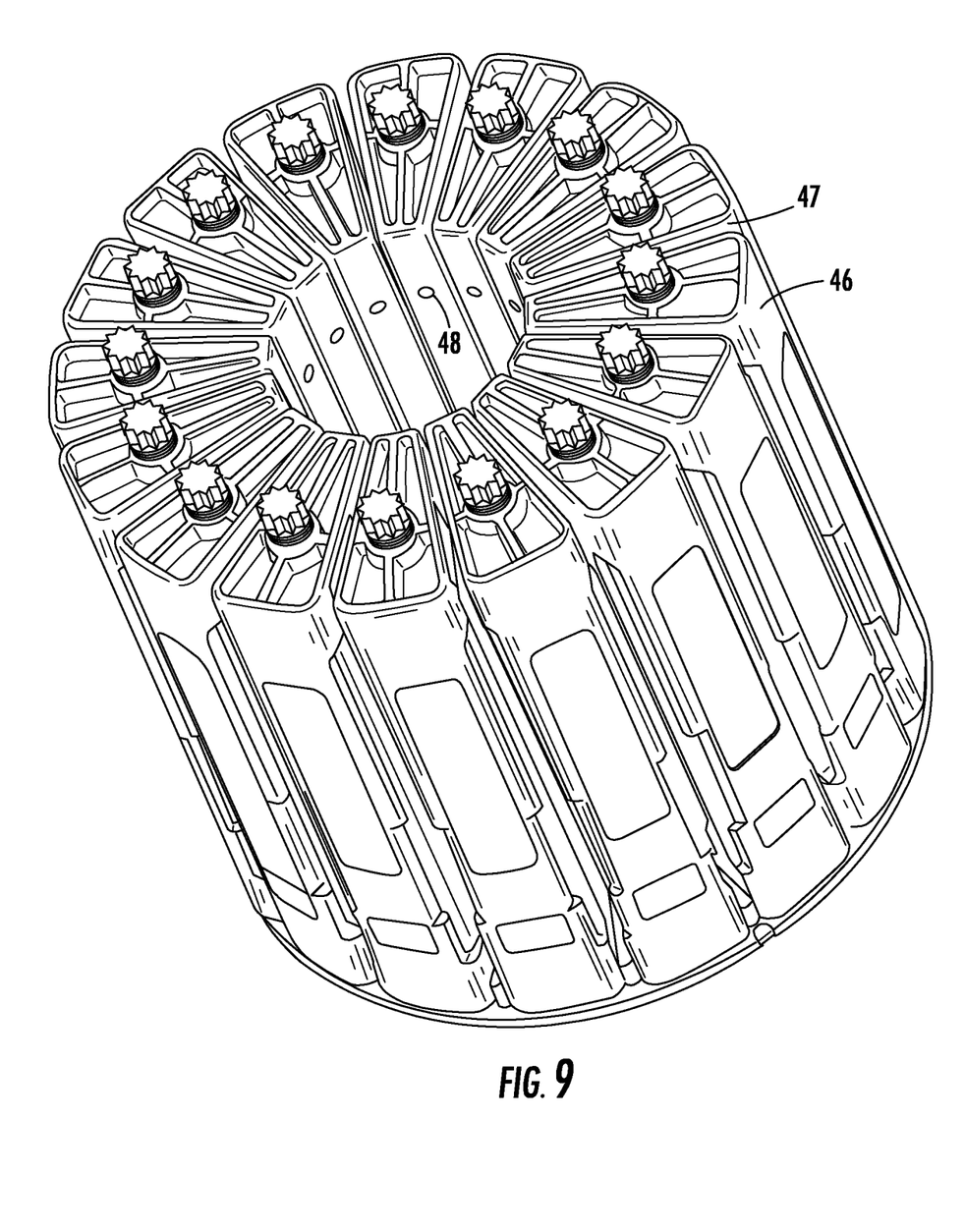
FIG. 9 is a perspective view of a vessel array that incorporates the plugged polymer reaction vessels and supporting frames depicted in FIG. 8.

FIG. 9 is a perspective view of a plurality of vessel assemblies 56 in frames 46 on a turntable for being placed in a common microwave cavity as set forth in the 250 application. Like the turntable 41, the rotating of the turntable 57 provides the advantage of being able to carry out a number of reactions at the same time in the same cavity while accommodating the standing node nature of microwaves in cavities of the size and shape into which the turntable 57 will fit.

EXPERIMENTAL

Table 1 (Milk Powder; a certified reference material) and Table 2 (Rice Flour) demonstrates the results of the vessel system and method according to the invention. The experiments were carried out as follows A sample was added to each 70 ml vessel in an amount of 0.5 grams. A combination of nitric acid and hydrochloric acid was added to each vessel in a 9:1 ratio ($HNO_3$ to HCl) by volume, and specifically as 9 ml of $HNO_3$ and 1 ml of HCl. The vessels were placed in a CEM MARS 6™ instrument which was used to carry out a 20-minute ramp to 200° C. followed by a 15 minute hold.

After cooling, the results were analyzed in a Thermo-iCap Q™ inductively coupled plasma mass spectroscopy (ICP- MS) instrument (ThermoFisher Scientific, www.thermofisher.com; accessed Feb. 27, 2019).

TABLE 1

| Milk Powder-Glass Liners in PPM | 23Na | 39K | 44Ca | 24Mg | 66Zn |
|---|---|---|---|---|---|
| 1 | 3420.8 | 11174 | 8870.2 | 845.27 | 31.192 |
| 2 | 3636.2 | 10742 | 8593.0 | 879.21 | 31.440 |
| 3 | 3713.0 | 12103 | 9418.3 | 880.45 | 30.841 |
| 4 | 3772.1 | 11878 | 9426.6 | 881.08 | 31.220 |
| 5 | 3785.8 | 12256 | 9503.0 | 888.41 | 31.387 |
| 6 | 3647.3 | 12199 | 9523.5 | 869.92 | 30.151 |
| 7 | 3483.5 | 11966 | 9387.4 | 872.33 | 30.367 |
| 8 | 3758.8 | 11686 | 9223.0 | 888.10 | 31.436 |
| 9 | 3871.3 | 12026 | 9548.7 | 913.55 | 32.041 |
| 10 | 3842.0 | 11944 | 9182.0 | 882.00 | 31.730 |
| 11 | 3842.3 | 11815 | 9244.3 | 899.37 | 31.277 |
| 12 | 3741.0 | 11875 | 9160.5 | 873.09 | 30.802 |
| True Value | 3176.0 | 11920 | 8810.0 | 892.00 | 33.800 |
| Average | 3709.5 | 11805 | 9256.7 | 881.07 | 31.157 |
| % Recovery | 116.80 | 99.04 | 105.07 | 98.774 | 92.181 |
| STD Deviation | 140.85 | 436.3 | 285.27 | 16.635 | 0.5395 |
| | 3.7970 | 3.696 | 3.0818 | 1.8881 | 1.7315 |

| H₂O₂ Blanks | 23Na | 39K | 44Ca | 24Mg | 66Zn |
|---|---|---|---|---|---|
| 1 | 3.90 | 0.30 | 0.48 | 0.01 | 0.02 |
| 2 | 3.68 | 0.28 | 0.46 | 0.01 | 0.02 |
| 3 | 3.28 | 0.24 | 0.40 | 0.02 | 0.01 |
| 4 | 4.86 | 0.45 | 0.63 | 0.03 | 0.02 |
| 5 | 4.12 | 0.41 | 0.39 | 0.02 | 0.02 |
| 6 | 3.67 | 0.28 | 0.47 | 0.01 | 0.02 |
| 7 | 3.64 | 0.28 | 0.42 | 0.01 | 0.01 |
| 8 | 4.11 | 0.28 | 0.68 | 0.02 | 0.01 |
| 9 | 5.08 | 0.91 | 0.46 | 0.02 | 0.02 |
| 10 | 4.72 | 0.37 | 0.49 | 0.02 | 0.01 |
| 11 | 3.42 | 0.29 | 0.33 | 0.01 | 0.01 |
| 12 | 4.35 | 0.35 | 0.50 | 0.03 | 0.02 |
| Average | 4.04 | 0.37 | 0.47 | 0.02 | 0.01 |

TABLE 2

| Rice Flour-Glass Liners in PPM | 39K | 42Ca | 26Mg | 68Zn | 65Cu | 55Mn |
|---|---|---|---|---|---|---|
| 1 | 1324.0 | 96.93 | 559.0 | 21.42 | 2.408 | 19.90 |
| 2 | 1250.3 | 104.4 | 519.4 | 18.34 | 2.391 | 18.69 |
| 3 | 1252.0 | 86.92 | 516.7 | 19.46 | 2.083 | 18.85 |
| 4 | 1225.9 | 139.2 | 506.9 | 19.06 | 2.221 | 18.37 |
| 5 | 1268.0 | 108.8 | 518.5 | 17.94 | 2.416 | 23.65 |
| 6 | 1267.8 | 104.1 | 537.9 | 20.28 | 2.211 | 18.66 |
| 7 | 1359.0 | 84.80 | 513.0 | 21.06 | 2.644 | 19.41 |
| 8 | 1278.2 | 99.93 | 538.9 | 19.91 | 2.413 | 18.84 |
| 9 | 1282.7 | 138.2 | 503.9 | 19.14 | 2.531 | 19.60 |
| 10 | 1245.2 | 114.2 | 550.7 | 20.76 | 2.436 | 18.36 |
| 11 | 1290.1 | 118.2 | 595.9 | 21.45 | 2.449 | 17.95 |
| 12 | 1220.6 | 97.29 | 535.6 | 18.96 | 2.076 | 19.46 |
| True Value | 1282 | 118.4 | 559.0 | 19.42 | 2.350 | 19.20 |
| Average | 1272 | 107.8 | 533.0 | 19.814 | 2.357 | 19.33 |
| % Recovery | 99.22 | 91.01 | 95.36 | 102.0 | 100.3 | 100.7 |
| STD Deviation | 39.47 | 17.42 | 26.26 | 1.188 | 0.174 | 1.485 |
| % RSD | 3.103 | 16.17 | 4.927 | 5.997 | 7.366 | 7.682 |

| H₂O₂ Blanks | 39K | 42Ca | 26Mg | 68Zn | 65Cu | 55Mn |
|---|---|---|---|---|---|---|

TABLE 2-continued

| 1 | 0.35 | 1.08 | 0.10 | 0.08 | 0.01 | 0.01 |
|---|---|---|---|---|---|---|
| 2 | 0.35 | 0.17 | 0.08 | 0.04 | 0.00 | 0.00 |
| 3 | 0.31 | 1.26 | 0.17 | 0.08 | 0.01 | 0.01 |
| 4 | 0.25 | 0.10 | 0.04 | 0.03 | 0.00 | 0.00 |
| 5 | 0.23 | 0.20 | 0.07 | 0.05 | 0.01 | 0.00 |
| 6 | 0.44 | 0.16 | 0.01 | 0.04 | 0.00 | 0.00 |
| 7 | 0.40 | 0.03 | 0.08 | 0.03 | 0.00 | 0.00 |
| 8 | 0.32 | 0.05 | 0.08 | 0.03 | 0.00 | 0.00 |
| 9 | 0.30 | −0.13 | 0.02 | 0.03 | 0.00 | 0.00 |
| 10 | 0.37 | 0.16 | 0.03 | 0.03 | 0.00 | 0.00 |
| 11 | 0.22 | 0.66 | 0.11 | 0.06 | 0.01 | 0.01 |
| 12 | 0.24 | 0.80 | 0.08 | 0.06 | 0.01 | 0.01 |
| Average | 0.32 | 0.34 | 0.07 | 0.04 | 0.01 | 0.00 |

As the results as against certified standards indicate, the percent recoveries are well within expected standard deviations. Similarly, the minimal amounts of the target elements present in the hydrogen peroxide blanks (i.e., the microwave absorbing liquid in the interstitial space), demonstrate that the structure of the vessel system succeeds in its intended use.

In the drawings and specification there has been set forth a preferred embodiment of the invention, and although specific terms have been employed, they are used in a generic and descriptive sense only and not for purposes of limitation, the scope of the invention being defined in the claims.

The invention claimed is:

1. A structural improvement for vessel systems for high temperature, high-pressure, microwave-assisted chemistry methods, the improvement comprising:
   a rigid liner cylinder that includes one closed end and one open end defining a mouth;
   a cylindrical liner cap positioned in said mouth of said rigid liner cylinder for closing said rigid liner cylinder; and
   said cylindrical liner cap including a depending cylindrical column that seats within the inside diameter of said rigid liner cylinder, a disk at one end of said depending cylindrical column and having a diameter sufficient to rest upon the rigid liner cylinder without falling into the rigid cylinder liner so that said cylindrical liner cap rests in said rigid liner cylinder at said mouth of said rigid liner cylinder, and a passage as part of said depending cylindrical column to provide gas venting at said cylindrical liner cap and from said rigid liner cylinder.

2. A vessel system according to claim 1 wherein said rigid liner cylinder is positioned inside of a cylindrical reaction vessel, said rigid liner cylinder having an outer diameter that together with the inner diameter of said cylindrical reaction vessel defines an interstitial space between said cylindrical reaction vessel and said rigid liner cylinder;
   said vessel system further comprising a microwave-transparent reaction vessel plug that rests in a defined position above said mouth of said rigid liner cylinder and coaxial with but not bearing against said cylindrical liner cap; and
   said vessel system further comprising a female threaded cap that engages male threads on said cylindrical reaction vessel at said mouth of said cylindrical reaction vessel and that bears against said reaction vessel plug to thereby provide a pressure resistant closure connection for said vessel system.

3. A vessel system according to claim 2 and further comprising a microwave-transparent cylindrical reinforcing sleeve surrounding said cylindrical reaction vessel, and coaxial with both said cylindrical reaction vessel and said rigid liner cylinder for increasing the radial pressure resistance strength of said vessel system.

4. A vessel system according to claim 1 wherein said rigid liner cylinder is positioned inside of a cylindrical reaction vessel, said rigid liner cylinder having an outer diameter that together with the inner diameter of said cylindrical reaction vessel defines an interstitial space between said cylindrical reaction vessel and said rigid liner cylinder;

said vessel system further comprising a microwave-transparent reaction vessel plug that rests in a defined position above said mouth of said rigid liner cylinder and coaxial with but not bearing against said liner cap; and said vessel system further comprising a cap that fits over said microwave-transparent reaction vessel plug, and the sides of said cap girdle the outside of the upper rim of the mouth of said reaction vessel.

5. A vessel system according to claim 4 and further comprising a microwave transparent cylindrical reinforcing sleeve surrounding said cylindrical reaction vessel, and coaxial with both said cylindrical reaction vessel and said rigid liner cylinder for increasing the radial pressure resistance strength of said vessel system.

6. A vessel system for high temperature, high-pressure, microwave-assisted chemistry methods, said vessel system comprising:

a cylindrical reaction vessel formed of a polymer that is chemically inert at high temperatures and that is transparent to microwave radiation, said cylindrical reaction vessel including one closed end and one open end, with said open end defining a mouth for said cylindrical reaction vessel;

a rigid liner cylinder positioned coaxially inside of said cylindrical reaction vessel, said rigid liner cylinder having an outer diameter that together with the inner diameter of said cylindrical reaction vessel defines an interstitial space between said cylindrical reaction vessel and said rigid liner cylinder;

said rigid liner cylinder including one closed end positioned adjacent to said closed end of said cylindrical reaction vessel and one open end defining a rigid liner cylinder mouth below said cylindrical reaction vessel mouth;

a cylindrical liner cap formed of a microwave-transparent material and positioned in said mouth of said rigid liner cylinder for closing said rigid liner cylinder;

said cylindrical liner cap including a depending cylindrical column having a circumference that closely matches the inside diameter of said rigid liner cylinder, a disk at one end of said depending cylindrical column having a diameter larger than the outer diameter of said rigid liner cylinder and smaller than the inner diameter of said cylindrical reaction vessel so that said cylindrical liner cap can rest in a defined position in said rigid liner cylinder at said mouth of said rigid liner cylinder, and a passage as part of said depending cylindrical column for providing a gas venting space between said depending cylindrical column of said cylindrical liner cap and said rigid liner cylinder;

a microwave-transparent reaction vessel plug that rests in said mouth of said cylindrical reaction vessel and above and coaxial with said mouth of said rigid liner cylinder and coaxial with said cylindrical liner cap but without bearing against said cylindrical liner cap; and a vessel system cap that bears against said reaction vessel plug to thereby provide a pressure resistant closure for said vessel system.

7. A vessel system according to claim 6 wherein said cylindrical reaction vessel is formed of a fluoropolymer;

said rigid liner cylinder is selected from the group consisting of glass and quartz; and said cylindrical liner cap is formed of a polymer that is chemically inert at high temperatures and that is transparent to microwave radiation.

8. A vessel system according to claim 6 wherein said cylindrical liner cap is formed of formed of a polymer selected from the group consisting of polytetrafluoroethylene (PTFE, TEFLON®), polychlorortrifluoroethylene (PCTFE, KELF®), polyvinylidene fluoride (PVDF, KYNAR®, SYMALIT®), poly(ethylene chlorotrifluoroethylene) (ECTFE, HALAR®), chlorinated Polyvinyl Chloride (CPVC), polyethylene terephalate G copolymer (PETG/PET), polycarbonate (PC), perfluoroalkoxy (PFA), fluorinated ethylene propylene (FEP), and ethylene-tetrafluoroethylene (ETFE).

9. A vessel system according to claim 6 and further comprising a microwave-transparent cylindrical reinforcing sleeve surrounding said cylindrical reaction vessel, and coaxial with both said cylindrical reaction vessel and said rigid liner cylinder for increasing the radial pressure resistance strength of said vessel system.

10. A vessel system for high-temperature high-pressure microwave assisted chemistry comprising:

a microwave transparent pressure releasing and resealing cylindrical reaction vessel nested coaxially inside of a microwave transparent pressure releasing cylindrical containment vessel with a small annular interstitial space between and defined by said nested reaction vessel and said nested containment vessel;

said coaxial nested cylindrical reaction vessel being closed by a sliding cap;

said coaxial nested cylindrical containment vessel being closed by a floating plug;

and a threaded flexible cap on said containment vessel that bears against said floating plug, with said floating plug bearing against said sliding cap.

11. The vessel system according to claim 10 wherein:

said coaxial nested cylindrical reaction vessel is selected from the group consisting of glass and quartz; and said coaxial nested cylindrical containment vessel is formed of a fluoropolymer.

12. The vessel system according to claim 11 surrounded by a microwave transparent reinforcing cylinder.

13. The vessel system according to claim 12 positioned in a flexible reinforcing frame that bears against said threaded flexible cap on said containment vessel.

14. A plurality of vessel systems according to claim 12 on a turntable in a common microwave cavity.

15. A plurality of vessel systems according to claim 10 in a common microwave cavity.

* * * * *